July 21, 1942. R. O. BROADBENT Re. 22,134

COIN SELECTOR FOR PAY TELEPHONES AND LIKE

Original Filed Aug. 27, 1936 2 Sheets-Sheet 1

INVENTOR.
RAY O. BROADBENT
BY M. Talbert Dick
ATTORNEY.

July 21, 1942. R. O. BROADBENT Re. 22,134

COIN SELECTOR FOR PAY TELEPHONES AND LIKE

Original Filed Aug. 27, 1936 2 Sheets-Sheet 2

INVENTOR.
RAY O. BROADBENT
BY
M. Talbert Dick
ATTORNEY.

Reissued July 21, 1942

Re. 22,134

UNITED STATES PATENT OFFICE 22,134

COIN SELECTOR FOR PAY TELEPHONES AND LIKE

Ray O. Broadbent, Des Moines, Iowa, assignor of one-fourth to Maude A. Ross, Des Moines, Iowa, one-fourth to Merle Ryerson, Omaha, Nebr., and one-fourth to Edward K. Brockner Original No. 2,090,383, dated August 17, 1937, Serial No. 98,189, August 27, 1936. Application for reissue August 16, 1939, Serial No. 290,420

13 Claims. (Cl. 194—97)

The principal object of my invention is to provide a coin selector for pay telephones and like that will eject all slugs and spurious coins before they enter the device they are intended to operate.

A further object of this invention is to provide a coin selector for pay telephones and like that electrically selects or differentiates between coins and slugs when a manually operated lever is actuated and returns all spurious coins to the user allowing the genuine coins to fall into the device to be operated.

A still further object of my invention is to provide a coin selector for pay telephones and like that will hold the coin within the selector unit until the manually operated lever is actuated for the identification of the coin.

More specifically the object of this invention is to provide a coin selector for pay telephones and like that depends upon the engraving on a genuine coin for its actuation.

A still further object of my invention is to provide a coin selector for pay telephones and like that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

There have been numerous attempts to create a device for the elimination of slugs and spurious coins from pay telephones and similar coin operated machines. The majority of these rely on a magnet for pulling the spurious coins out of the device before they operate the device. However, these devices are only successful on ferrous metals and are of no value when copper, brass, nickel, aluminum or similar slugs are used. Also some types work on the principle that all slugs have a hole in the center and these devices only eject those slugs which do have a hole in the center. None of the devices now in use depend upon the peculiarities of the engraved portions of my coins. There has been a distinct need for a device that will successfully prevent the use of slugs in operating slot machines. Many thousands of dollars are lost each year by owners of slot machine dispensers and automatic pay devices through the use of slugs in those machines as well as loss of merchandise through this fraudulent means. There is the ever-present danger of jamming the machine, thus necessitating repairs and costly delays. I have overcome these difficulties and supplied a need as will be appreciated and as is hereinafter more fully set forth.

Figure 1:
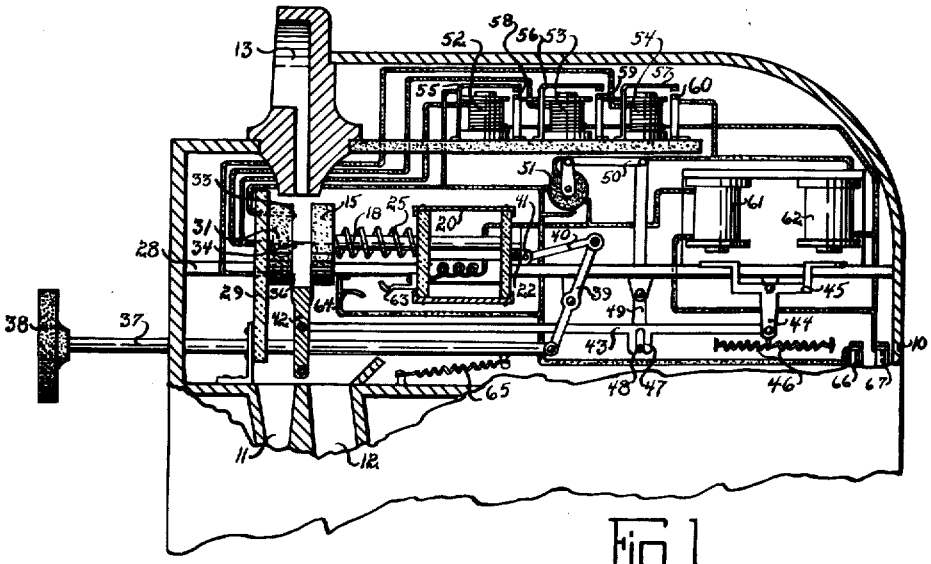
Fig. 1 is a side sectional view of my complete coin selector as attached to a portion of a pay telephone.

Referring to the drawings, I have used the numeral 10 to designate the housing of my device including the housing of an ordinary pay telephone having situated therein a return slot 11 and a coin slot 12 as shown in Fig. 1. The numeral 13 designates the coin entrance and as is well known, there are generally three of such entrances on a pay telephone, one to receive nickels, one to receive dimes and one to receive quarters. The numerals 14, 15 and 16 designate coin followers of the approximate diameter of a quarter, dime and nickel respectively and constructed of an insulating material such as hard rubber fiber or the like. These followers each have a shaft secured to the rear central portion and extending rearwardly and which I have designated by the numerals 17, 18 and 19 respectively. These shafts in turn are slidably mounted in a shuttle 20 which is of box-like construction and has its forward and rear surfaces constructed of an insulating material as shown in the drawings.

Figure 3:
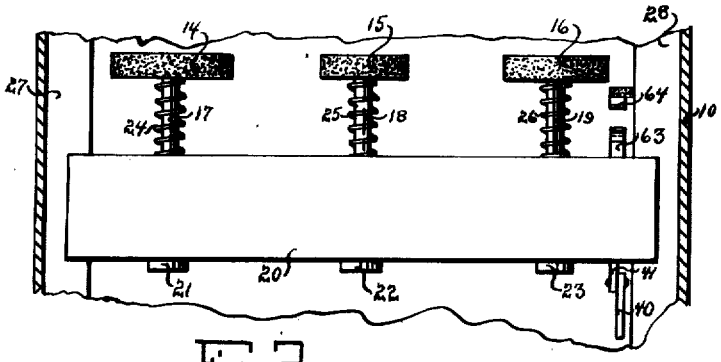
Fig. 3 is a top plan view of the shuttle and coin followers of my device.

The numerals 21, 22 and 23 designate stops secured to the rear end of each of the rods 17, 18 and 19 respectively which limit the forward sliding movement of the rods and determine the extended position of the followers 14, 15 and 16. The numerals 24, 25 and 26 designate coil springs about the rods 17, 18 and 19 and partially compressed between the front surface of the shuttle 20 and the rear surface of the followers 14, 15 and 16 respectively. I have used the numerals 27 and 28 to designate guide rails secured to the housing 10 of the device and upon which the shuttle 20 is slidably mounted as shown in Figs. 3 and 5 of the drawings. Rigidly secured within the housing of the device and extending upwardly near its forward portion is the insulative wall 29 which supports the coin plates 30, 31 and 32 which are spaced from and concentric with the followers 14, 15 and 16 as shown in Fig. 1. These plates each have the electric contact feeler points 33, 34, 35 and 36 which protrude through their respective plates a slight distance as shown. As corresponding numerals designate respective contact points and are electrically connected as shown in the schematic diagram in Fig. 4 of the drawings, they will be referred to as a single unit. It will here be noted by reference to Fig. 1 that the rearward or contact faces of these coin plates are directly parallel to and under the forward wall of the coin slot 13 so that a coin dropping through the slot must drop between its respective follower and coin plate. I have used the numeral 37 to designate a shaft slidably mounted within the housing of the device, extending through the forward wall of the device, and having on its forward end a knob 38 to facilitate the manual actuation of the shaft 37. Pivotally secured to the rearward end of this shaft is the lever 39 which has one of its ends suitably pivoted on a bearing secured to the guide rail 28 and has its other end pivotally secured to a link 40 which is in turn pivotally secured to a bearing 41 which is rigidly secured to the rear face of the shuttle 20 for actuating the same and as is shown in Fig. 1 of the drawings.

Figure 2:
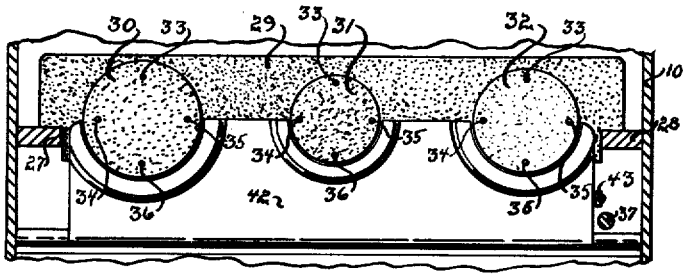
Fig. 2 is a sectional view of a portion of my device showing the coin selectors.

Thus by manually pushing on the knob 38 the shaft 37 will be pushed rearwardly, actuating the lever 39 and pushing the shuttle 20 forward. Positioned below and between each set of follower and coin plates is the stop and deflector plate 42 which is pivotally secured near its lower marginal edge to the housing 10 of the device. This deflector plate 42 has a semi-circular cut-out portion which is also widened and rests adjacent the lower half of the coin plates as shown in Fig. 2 of the drawings. Pivotally secured to the deflector plate 42 near its central portions is the bar 43 which extends rearwardly and has its rearward end pivotally secured to a lever 44 which is secured to the central portion of a magnet arm 45 which is, in turn, pivotally secured to the guide rail 28 as shown in Fig. 1.

This lever 44 is held in its neutral central position by the opposing coil springs 46 which have their free ends secured to the housing and which tends to hold the lever in a vertical position. The numeral 47 designates a fork integrally formed on the bar 43 and extending downwardly and which receives a pin 48 secured to a lever 49 as shown in the drawings. This lever 49 is pivotally secured to the guide rail 28, extends up one side wall of the housing 10 of the device and has its other end pivotally secured to a link 50 which in turn is pivotally secured to the operating arm of a bridge switch 51 which is of the common type. I have used the numerals 52, 53 and 54 to designate three circuit breaker magnets having the breaker arms 55, 56 and 57 respectively and the contact points 58, 59 and 60 respectively as shown in the drawings. The numeral 61 designates a selector magnet operatively arranged above the forward end of the magnet arm 45. The numeral 62 designates a similar selector magnet operatively arranged adjacent the rearward end of the magnet arm 45. These magnets are so arranged that when the magnet 61 is in operation the magnet arm is drawn upward at its forward end moving the lever 44 forwardly operating the bar 43. Similarly when the magnet 62 is energized, the rearward end of the arm 45 is drawn upwardly pulling the lever 44 rearwardly and actuating the bar 43. The numeral 63 designates a contact arm secured to the forward face of the shuttle 20 as shown in Figs. 1 and 3 of the drawings. The numeral 64 designates the stationary contact arm secured to the guide rail 28 insulated from contact therewith, and capable of receiving the contact arm 63 when the shuttle 20 is moved forwardly. Thus it will be seen that when the knob 38 is manually actuated, the shuttle will move forwardly as hereinbefore described, closing the contact between the arms 63 and 64. When pressure is released on the knob 38, the rod 37 will be pulled to its more forwardly position by virtue of the spring 65 which has one end secured to the rod 37 and its other end secured to the housing 10 as shown in Fig. 1.

Figure 4:
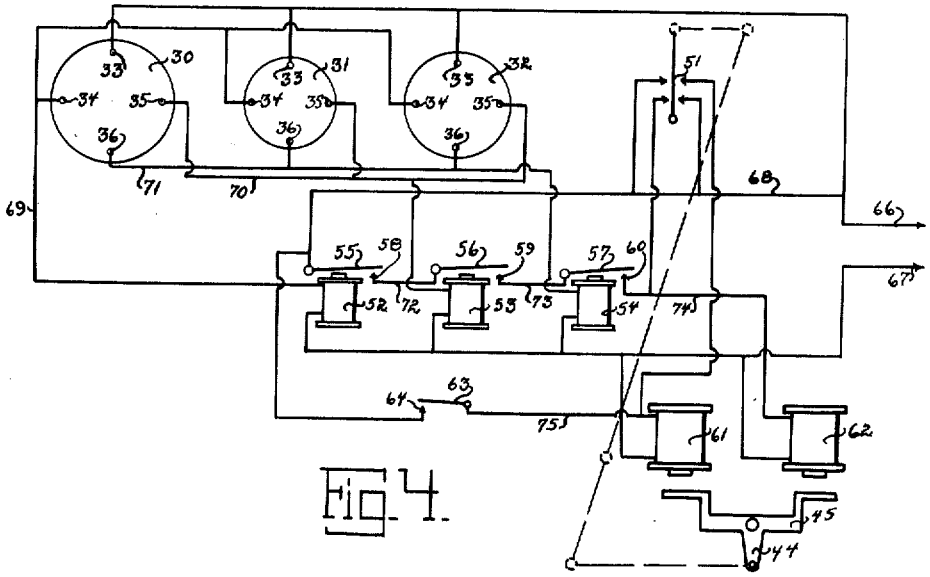
Fig. 4 is a schematic wiring diagram of the electric circuit of my device.
Figure 5:
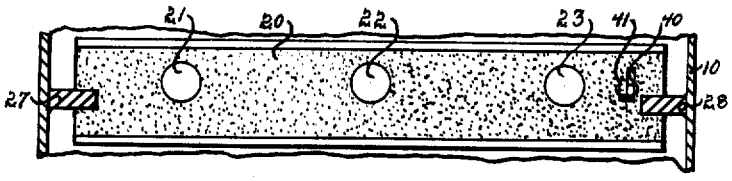
Fig. 5 is a rear cross-sectional view of a portion of my device showing the shuttle and the guide bars upon which it rests.

Referring to Fig. 4 of the drawings, I have used the numerals 66 and 67 to designate the input electric wires which are in communication with a suitable source of power such as the telephone line voltage. When thus connected with the telephone line voltage, these input wires 66 and 67 are connected through the ordinary switches within the telephone, such as the receiver switch. The wire 66 is in communication with the contact points 33 of the contact plates. The numeral 68 designates a lead wire in communication between the wire 66, two contacts of the switch 51, the stationary contact 64 of the shuttle operated switch and the breaker 55 of the electromagnet 52. The numeral 69 designates a lead wire in electrical communication between the contact points 34 of the contact plates and one end of the windings of the electromagnet 52 which is also connected to the lower end of the windings of the magnets 53 and 54, to the lower end of the magnets 61 and 62 and thence connected to the wire 67 as shown in the drawings. The numeral 70 designates a lead wire in electrical contact with the contacts 35 of the plates and in communication with the upper end of the magnet coil 53. The numeral 71 designates an electric lead line in communication with the contacts 36 of the contact plates and in electrical communication with the upper end of the windings of the magnet 54. The numeral 72 designates a wire in communication between the contact 58 of the magnet 52 and the arms 56 of the magnet 53. The numeral 73 designates a lead wire in communication between the contact 59 of the magnet 53 and the arm 57 of the magnet 54. The numeral 74 designates a lead wire in communication between one contact of the switch 51, the contact 60 of the magnet 54 and the upper end of the windings of the magnet 62. The numeral 75 designates a lead wire in communication between the contact arm 63 and the upper winding of the magnet 61, and also in communication with one contact of the switch 51 as is shown in the schematic diagram. The dash lines shown in Fig. 4 designate generally a portion of the bar 43, the lever 49 and the link 50 which operate the switch 51 for purposes of identification of relative action in the schematic diagram. Any suitable form of release switch mechanism may be provided for breaking the holding or lock-up circuit which is established through the bridge switch 51 to either of the magnets 61 and 62, this circuit breaking function occurring at the end of the operating cycle, such as just at the end of the backward or restoring motion of the shuttle 20. In telephone adaptations of my invention, this release function can be performed by a switch within the telephone, such as the aforesaid receiver switch.

The practical operation of my device is as follows: As all of the coin plates operate in the same manner, I shall use the one actuated by a dime as an illustration.

The coin is dropped through the slot 13 and will drop between the follower 15 and the plate 31, resting on the concave portion of the deflector plate 42. After the coin has been dropped into the device the knob 38 is pushed rearwardly thus moving the shuttle 20 and moving the follower 15 forwardly forcing the coin against the contacts of the plate 31. It will here be noted that all coins are engraved and are quite irregular in facial contour. Thus all four of the contact points 33, 34, 35 and 36 will not be short circuited by the coin. As the rod 37 is pushed farther rearwardly, the shuttle will move forwardly against the compression of the spring 25 until contact is made between the contact arms 63 and 64. This closes the circuit between the source of current and the electromagnet 61. The magnet 61 thus being energized will pull the forward end of the magnet arm 45 toward it, thus pivoting this arm and moving the lever 44 in a forwardly direction. This causes the deflector plate 42 to pivot forwardly and at the same time operates the bridge switch 51 thus keeping the magnet 61 in circuit so that when pressure on the knob 38 has ceased, the spring 65 will return the knob as well as the shuttle and its appendant mechanism toward its normal position. As the bridge contact switch holds the circuit for a time, the plate 42 will remain in its upwardly and forwardly sloped position after the pressure on the coin has ceased, thus deflecting the coin downwardly and through the coin chute 12 where it will operate the mechanism. In those telephone adaptations of my invention which use the receiver switch as the release switch of the device, when the shuttle 20 is moved back to its rearward position, and the receiver is placed back on the hook of the telephone at the completion of the call, the current is thereupon cut off by the receiver switch, with the result that the neutralizing springs 46 will return the mechanism to a normal position, as the magnet 61 will not remain energized after such interruption of the current supply.

If a slug or other spurious coin is inserted in the coin slot 13, it will take a similar position between the follower 15 and the plate 31. However, when the shuttle is actuated by the rod 37, the follower will force the counterfeit coin against the contacts on the plate 31. This short circuits all of the contacts 33, 34, 35 and 36 thus actuating all of the magnets 52, 53 and 54 closing the arms 55, 56 and 57 upon their respective contact points 58, 59 and 60, completing the electrical circuit to the magnet 62. As the magnet 62 is energized, it will pull the rearward end of the magnet arm 45 upwardly thus moving the lever 44 rearwardly so that as the pressure is released the spurious coin will drop into the chute 11 which returns the coin to the user without actuating the mechanism of the device intended to be operated. The action of this counterfeit coin detector circuit rotates the switch 51 in the other direction closing and retaining the contact between the source of electrical energy and the magnet 62 until the device has returned to a normal rearward position, at which time the placing of the receiver back on the hook deenergizes the magnet 62 and restores the switch 51 and deflector plate 42 to their normal positions, in the same manner described above. It will be noted that it is necessary to short circuit all four of the contact points before the magnet 62 is actuated due to the relays 52, 53, and 54; thus if two or three points should touch on the engraving of a genuine coin, it will not actuated the return mechanism. It is very unlikely that all four contact points would touch a genuine coin. If, however, a smooth coin is placed in the device, it will return it to the user, so that he will not be out his money.

It will be noted that the first pressure of the follower on a slug will immediately short circuit all of the contacts on the coin plate, thus moving the plate 42 for the rejection of the spurious coin. This moves the switch 51 to hold the contact and even when the knob 38 is pushed to its rearmost position and contact is made between the contacts 63 and 64 closing the circuit to the magnet 61 no counter action will take place.

After the magnet arm has been drawn adjacent to the magnet 62 the rearward end of the arm 45 will be at such a distance from the magnet 61 that the magnetic field of the magnet 61 can not possibly overcome the magnetic field of the magnet 62 and move the arm 45 in the other direction.

Thus it will be seen that I have provided a coin selector for telephones and the like that will reject all spurious coins, slugs and worn coins before they enter the mechanism they are intended to actuate. My device will work on any type of metallic substance that will conduct an electric current. It is simple to operate, having only one manual control and can not be tampered with without destroying the device.

Some changes may be made in the construction and arrangement of my improved coin selector for pay telephones and the like without departing from the real spirit and purpose of my invention, and it is my intention to cover by my claims any modified forms of structure or use of mechanical equivalents which may be reasonably included within their scope.

I claim:

1. In combination with a coin operated mechanism having a coin return chute and an actuating coin chute, a coin selector comprising, a housing, a coin receiving slot, a coin plate adjacent said slot having its face parallel with said slot, a plurality of spaced apart electrical contact points on the side of said coin plate facing said slot, a deflector member movably mounted in a plane below said coin plate and below said slot for first holding coins and then directing the same either into said return chute or said coin chute, a follower plate slidably mounted in said housing and normally resting in spaced relationship to said coin plate and capable when actuated of forcing a coin resting on said deflector toward and against said coin plate, a means for causing said follower plate to move toward said coin plate at times, an electromagnet, a second electromagnet, a magnet arm capable of being actuated by either of said magnets, a means for operatively connecting said magnet arm to said deflector plate, an electric circuit connecting some of said contact points to one of said electromagnets, a second electric circuit having one end connected to a contact point not in said first mentioned circuit and its other end designed to be in communication with a source of electrical energy; said electric circuits capable of being connected together by said contact points being short circuited by a spurious metallic coin having comparatively smooth sides when forced adjacent said coin plate by said follower plate for actuating said last mentioned electromagnet and causing said deflector to guide said smooth faced metallic coin into the return chute, a third electric circuit connecting said other electromagnet with a source of electrical energy, and a switch imposed in said last mentioned electric circuit and operatively connected for actuation to the first mentioned means for causing said follower plate to move toward said coin plate; said third electric circuit, when closed by said switch capable of actuating said last mentioned electromagnet for causing said deflector to guide a lawful coin into said actuating chute, when said contact points are not short circuited by a lawful coin of irregular facial contours being forced against it by said follower plate; said contact points capable of being short circuited by a spurious smooth metallic coin and not capable of being short circuited by a lawful coin having irregular facial contours.

2. In combination with a coin operated mechanism having a coin return chute and an actuating coin chute, a coin selector comprising, a housing, a coin receiving slot, a coin plate adjacent said slot, a plurality of spaced apart electrical contact points on one side of said coin plate, a deflector member adjacent said coin plate for directing coins into either said return chute or said coin chute when actuated, a means for moving a coin that has been placed in said coin receiving slot and said coin plate into engagement with each other with said coin adjacent the said contact points, an electric means operatively connected to said deflector for moving said deflector for guiding a coin into said return chute, a second electric means operatively connected to said deflector for moving said deflector in the opposite direction for guiding a coin into said actuating coin chute, an electric circuit connecting some of said contact points to said first mentioned electric means, a second electric circuit connecting a contact point not in said first mentioned circuit to a source of electrical energy; said electric circuits capable of being connected together by said contact points being short circuited by a spurious smooth faced metallic coin contacting said contact points whereby said first mentioned electric means will cause said deflector to guide said spurious coin into said return chute, a third electric circuit connecting said second mentioned electric means with a source of electrical energy, and a switch imposed in said last mentioned electric circuit and operatively connected for actuation to the first mentioned means for bringing said coin plate and coin together; said third electric circuit, when closed by said switch capable of actuating said second mentioned electric means for causing said deflector to guide a lawful irregular facial contour coin into said actuating chute when said contact points are not short circuited by said lawful coin of irregular facial contours; said contact points capable of being short circuited by a spurious smooth metallic coin and not capable of being short circuited by a lawful coin having irregular facial contours.

3. In combination with a coin operated mechanism having a coin return chute and an actuating coin chute, a coin selector comprising, a housing, a coin receiving slot, a coin plate adjacent said slot, a plurality of spaced apart electrical contact points on one side of said coin plate, a deflector member adjacent said coin plate for directing coins into either said return chute or said coin chute when actuated, a means for moving a coin that has been placed in said coin receiving slot and said coin plate into engagement with each other with said coin adjacent the said contact points, an electric means operatively connected to said deflector for moving said deflector for guiding a coin into said return chute, a second electric means operatively connected to said deflector in the opposite direction for guiding a coin into said actuating coin chute, an electric circuit connecting some of said contact points to said first mentioned electric means, a second electric circuit connecting a contact point not in said first mentioned circuit and its other end designed to be in communication with a source of electrical energy; said electric circuits capable of being connected together by said contact points being short circuited by a spurious smooth faced metallic coin contacting said contact points whereby said first mentioned electric means will cause said deflector to guide said spurious coin into said return chute, a third electric circuit connecting said second mentioned electric means with a source of electrical energy, a switch imposed in said last mentioned electric circuit and operatively connected for actuation to the first mentioned means for bringing said coin plate and coin together; said third electric circuit, when closed by said switch capable of actuating said second mentioned electric means for causing said deflector to guide a lawful irregular facial contour coin into said actuating chute when said contact points are not short circuited by said lawful coin of irregular facial contours; said contact points capable of being short circuited by a spurious smooth metallic coin and not capable of being short circuited by a lawful coin having irregular facial contours, and a bridge switch for holding either said first and second circuits closed or said last mentioned circuit closed until said means for moving a coin and said coin plate into engagement with each other as returned to a normal position.

4. In combination with a coin operated mechanism having a coin return chute and an actuating coin chute, a coin selector comprising, a housing, a coin receiving slot, a coin plate adjacent said slot having its face parallel with said slot, a plurality of spaced apart electrical contact points on the side of said coin plate facing said slot, a deflector member movably mounted in a plane below said coin plate and below said slot for first holding coins and then directing the same either into said return chute or said coin chute, a follower plate slidably mounted in said housing and normally resting in spaced relationship to said coin plate and capable when actuated of forcing a coin resting on said deflector toward and against said coin plate, a manually operated means for causing said follower plate to move toward said coin plate at times, an electromagnet, a second electromagnet, a magnet arm capable of being actuated by either of said magnets, a means for operatively connecting said magnet arm to said deflector plate, an electric circuit connecting some of said contact points to one of said electromagnets, a second electric circuit having one end connected to a contact point not in said first mentioned circuit and its other end designed to be in communication with a source of electrical energy; said electric circuits capable of being connected together by said contact points being short circuited by a spurious metallic coin having comparatively smooth sides when forced adjacent said coin plate by said follower plate for actuating said last mentioned electromagnet and causing said deflector to guide said smooth faced metallic coin into the return chute, a third electric circuit connecting said other electromagnet with a source of electrical energy, and a switch imposed in said last mentioned electric circuit and operatively connected for actuation to the first mentioned means for causing said follower plate to move toward said coin plate; said third electric circuit, when closed by said switch capable of actuating said last mentioned electromagnet for causing said deflector to guide a lawful coin into said actuating chute, when said contact points are not short circuited by a lawful coin of irregular facial contours being forced against it by said follower plate; said contact points capable of being short circuited by a spurious smooth metallic coin and not capable of being short circuited by a lawful coin having irregular facial contours.

5. In combination with a coin operated mechanism having a coin return chute and an actuating coin chute, a coin selector comprising, a housing, a coin receiving slot, a coin plate adjacent said slot, a plurality of spaced apart electrical contact points on one side of said coin plate, a deflector member adjacent said coin plate for directing coins into either said return chute or said coin chute when actuated, a yielding means for moving a coin that has been placed in said coin receiving slot and said coin plate into yielding engagement with each other with said coin adjacent the said contact points, an electric means operatively connected to said deflector for moving said deflector for guiding a coin into said return chute, a second electric means operatively connected to said deflector for moving said deflector in the opposite direction for guiding a coin into said actuating coin chute, an electric circuit connecting some of said contact points to said first mentioned electric means, a second electric circuit connecting a contact point not in said first mentioned circuit to a source of electrical energy; said electric circuits capable of being connected together by said contact points being short circuited by a spurious smooth faced metallic coin contacting said contact points whereby said first mentioned electric means will cause said deflector to guide said spurious coin into said return chute, a third electric circuit connecting said second mentioned electric means with a source of electrical energy, and a switch imposed in said last mentioned electric circuit and operatively connected for actuation to the first mentioned means for bringing said coin plate and coin together; said third electric circuit, when closed by said switch capable of actuating said second mentioned electric means for causing said deflector to guide a lawful irregular facial contour coin into said actuating chute when said contact points are not short circuited by said lawful coin of irregular facial contours; said contact points capable of being short circuited by a spurious smooth metallic coin and not capable of being short circuited by a lawful coin having irregular facial contours.

6. In combination with a coin operated mechanism having a coin return chute and an actuating coin chute, a coin selector comprising, a housing, a coin receiving slot, a coin plate adjacent said slot, a plurality of spaced apart electrical contact points on one side of said coin plate, a deflector member adjacent said coin plate for directing coins into either said return chute or said coin chute when actuated, a means for moving a coin that has been placed in said coin receiving slot and said coin plate into engagement with each other with said coin adjacent the said contact points, an electric means operatively connected to said deflector for moving said deflector for guiding a coin into said return chute, a second electric means operatively connected to said deflector for moving said deflector in the opposite direction for guiding a coin into said actuating coin chute, an electric circuit connecting some of said contact points to said first mentioned electric means, a second electric circuit connecting a contact point not in said first mentioned circuit to a source of electrical energy; said electric circuits capable of being connected together by all of said contact points being short circuited by a spurious smooth faced metallic coin contacting said contact points whereby said first mentioned electric means will cause said deflector to guide said spurious coin into said return chute, a third electric circuit connecting said second mentioned electric means with a source of electrical energy, and a switch imposed in said last mentioned electric circuit and operatively connected for actuation to the first mentioned means for bringing said coin plate and coin together; said third electric circuit, when closed by said switch capable of actuating said second mentioned electric means for causing said deflector to guide a lawful irregular facial contour coin into said actuating chute when said contact points are not short circuited by said lawful coin of irregular facial contours; said contact points capable of all being short circuited by a spurious smooth metallic coin and not capable of being short circuited by a lawful coin having irregular facial contour.

7. In combination with a coin operated mechanism having a coin return chute and an actuating coin chute, a coin selector comprising, a housing, a coin receiving slot, a plurality of spaced apart electrical contact points, a deflector member for directing coins into either said return chute or said coin chute when actuated, a means for moving a coin that has been placed in said coin receiving slot and said contact points toward each other and into possible engagement with each other, an electric means operatively connected to said deflector for moving said deflector in one direction for guiding a coin into said return chute, a second electric means operatively connected to said deflector for moving said deflector in the opposite direction for guiding a coin into said actuating chute, an electric circuit connecting some of said contact points to said first mentioned electric means, a second electric connecting a contact point not in said first mentioned circuit to a source of electrical energy; said electric circuit capable of being connected together by said contact points all being short circuited by a spurious smooth faced metallic coin contacting all of said contact points whereby said first mentioned electrical means will cause said deflector to guide said spurious coin into said return chute, a third electrical circuit connecting said second mentioned electrical means with a source of electrical energy, a switch imposed in said last mentioned electric circuit and operatively connected for actuation to the first mentioned means for bringing said contact points and coin toward each other; said third electric circuit, when closed by said switch capable of actuating said second mentioned electric means for causing said deflector to guide a lawful irregular facial contour coin into said actuating chute when said actuating points are not short circuited by said lawful coin of irregular facial contours; said contact points capable of being short circuited by a spurious smooth metallic coin and not capable of being short circuited by a lawful coin having irregular facial contours.

8. In combination with a coin operated mechanism having a coin return chute and an actuating coin chute, a coin selector comprising, a housing, a coin receiving slot, a plurality of spaced apart electrical contact points having their contact surfaces in the same place, a deflector member for directing coin into either said return chute or said coin chute when actuated, a means for moving a coin that has been placed in said coin receiving slot and said contact points toward each other and into possible engagement with each other, an electric means operatively connected to said deflector for moving said deflector in one direction for guiding a coin into said return chute, a second electric means operatively connected to said deflector for moving said deflector in the opposite direction for guiding a coin into said actuating chute, an electric circuit connecting some of said contact points to said first mentioned electric means, a second electric circuit connecting a contact point not in said first mentioned circuit to a source of electrical energy; said electric circuit capable of being connected together by said contact points all being short circuited by a spurious smooth faced metallic coin contacting all of said contact points whereby said first mentioned electrical means will cause said deflector to guide said spurious coin into said return chute, a third electrical circuit connecting said second mentioned electrical means with a source of electrical energy, a switch imposed in said last mentioned electric circuit and operatively connected for actuation to the first mentioned means for bringing said contact points and coin toward each other; said third electric circuit, when closed by said switch capable of actuating said second mentioned electric means for causing said deflector to guide a lawful irregular facial contour coin into said actuating chute when said actuating points are not short circuited by said lawful coin of irregular facial contours; said contact points capable of being short circuited by a lawful coin having irregular facial contours.

9. In apparatus of the class described, the combination of a coin-receiving opening, a coin acceptance chute, a slug rejection chute, electrical detecting means associated with said coin-receiving opening, a manually actuated member for causing said electrical detecting means and the coins or slugs inserted into said coin-receiving opening to be brought into contact with each other, a deflector member normally occupying a neutral position with respect to said coin acceptance chute and to said slug rejection chute, first actuating means electrically connected with said electrical detecting means to be responsive thereto for causing said deflector member to be actuated in one direction, and second actuating means responsive to predetermined motion of said manually actuated member for causing said deflector member to be actuated in the other direction if the deflector member has not been earlier actuated in the same operating cycle by said first actuating means.

10. In apparatus of the class described, the combination of a coin-receiving opening, a coin acceptance chute, a slug rejection chute, electrical detecting means associated with said coin-receiving opening, a manually actuated member for causing said electrical detecting means and the coins or slugs inserted into said coin-receiving opening to be brought into contact with each other, a deflector member normally occupying a neutral position with respect to said coin acceptance chute and to said slug rejection chute, a first electromagnet having electrical connection with said electrical detecting means so as to be responsive thereto for causing said deflector member to be actuated in the direction to effect discharge through said slug rejection chute if said electrical detecting means senses the presence of a slug in said coin-receiving opening, and a second electromagnet responsive to continued motion of said manually actuated member for causing said deflector member to be actuated in the reverse direction to effect discharge through said coin acceptance chute if the deflector member has not been earlier actuated in the same operating cycle by said first electromagnet.

11. In apparatus of the class described, the combination of a coin-receiving opening, a coin acceptance chute, a slug rejection chute, electrical detecting means associated with said coin-receiving opening, a manually actuated member for causing said electrical detecting means and the coins or slugs inserted into said coin-receiving opening to be brought into contact with each other, a deflector member normally occupying a neutral position with respect to said coin acceptance chute and to said slug rejection chute, a series of chain relays having electrical connection with said electrical detecting means so as to be responsive to circuits therethrough, a first electromagnet responsive to said chain relays for causing said deflector member to be actuated in the direction to effect discharge through said rejection chute if said electrical detecting means senses the presence of a slug in said coin-receiving opening, a switch adapted to be closed by the motion of said manually actuated member after the latter has effected engagement between said electrical detecting means and the coin or slug in said coin-receiving opening, a second electromagnet responsive to said switch for causing said deflector member to be actuated in the reverse direction to effect discharge through said coin acceptance chute if the deflector member has not been earlier actuated in the same operating cycle by said first electromagnet, and bridging switch means for maintaining the energization of either of said electromagnets until after said deflector member has had opportunity to effect discharge of the coin or slug into said acceptance chute or into said rejection chute.

12. In apparatus of the class described, the combination of a coin receiving passageway, an accepting chute and a rejecting chute leading therefrom, detector mechanism associated with said coin receiving passageway comprising a plurality of electrical detector contacts, a manually actuated member for causing said detector contacts and the coins or slugs inserted into said coin receiving passageway to be brought into contact with each other, a deflector member normally occupying a neutral position with respect to said accepting chute and to said rejecting chute, a plurality of relays electrically connected to said detector contacts to respond to electrical circuits therethrough, a plurality of armatures and armature contacts responding to said relays, a control circuit extending in series through said armature contacts, electromagnetic means responsive to said control circuit for actuating said deflector member in one direction, and means responsive to predetermined motion of said manually actuated member for causing said deflector member to be actuated in the other direction if said deflector member has not been earlier actuated in the same operating cycle by said electromagnetic means operating in response to said control circuit.

13. In combination with a coin operated mechanism having a coin acceptance chute and a slug rejection chute, a coin selector comprising, a housing, a coin receiving slot therein, electrical detecting means adapted to engage coins or slugs inserted into said coin receiving slot, a deflector member associated with said coin receiving slot and operative to support the coin or slug in a testing position in said slot, actuating means for bringing said electrical detecting means and the coin or slug into contact with each other while the coin or slug is thus supported by said deflector member, said deflector member normally occupying a neutral position with respect to said coin acceptance chute and said slug rejection chute while thus supporting the coin or slug, and means controlled by said electrical detecting means for causing said deflector member to be actuated in either direction from said neutral position for deflecting coins into said acceptance chute and slugs into said rejection chute.

RAY O. BROADBENT.